United States Patent [19]

Babcock

[11] Patent Number: 4,512,450
[45] Date of Patent: Apr. 23, 1985

[54] CLUTCH BRAKE

[76] Inventor: Daniel A. Babcock, 4609 Wilcox, Holt, Mich. 48842

[21] Appl. No.: 383,252

[22] Filed: May 28, 1982

Related U.S. Application Data

[63] Continuation-in-part of Ser. No. 317,484, Nov. 2, 1981, abandoned.

[51] Int. Cl.³ .................... F16D 69/00; F16D 13/68
[52] U.S. Cl. .................... 192/12 R; 192/18 R; 192/107 R; 192/70.13; 192/DIG. 1
[58] Field of Search ............ 192/12 R, 13 R, 18 R, 192/70.13, DIG. 1, 107 R; 188/218 XL, 73.32, 73.2

[56] References Cited

U.S. PATENT DOCUMENTS

| 357,095 | 2/1887 | Potts | 192/DIG. 1 |
|---|---|---|---|
| 1,203,484 | 10/1916 | Carter | 192/DIG. 1 |
| 1,991,569 | 2/1935 | Nickles | 192/70.13 |
| 3,105,579 | 10/1963 | Moore et al. | 192/13 R |
| 3,202,247 | 8/1965 | Schmidt et al. | 192/18 R |
| 4,186,826 | 2/1980 | MacKendrick | 192/13 R |

Primary Examiner—George H. Krizmanich
Attorney, Agent, or Firm—Malcolm R. McKinnon

[57] ABSTRACT

A clutch brake particularly adapted for use with heavy duty automotive vehicle clutches, the clutch brake including an annular base comprised of a pair of initially separate sections incorporating radial interlocking teeth which permit the clutch brake to be assembled and installed on the driven shaft of the clutch without requiring disassembly of such driven shaft.

5 Claims, 8 Drawing Figures

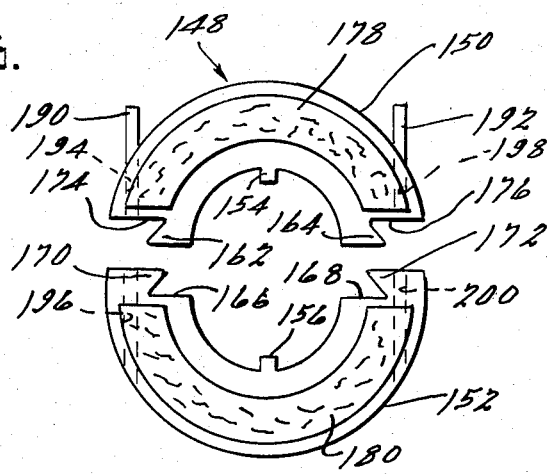
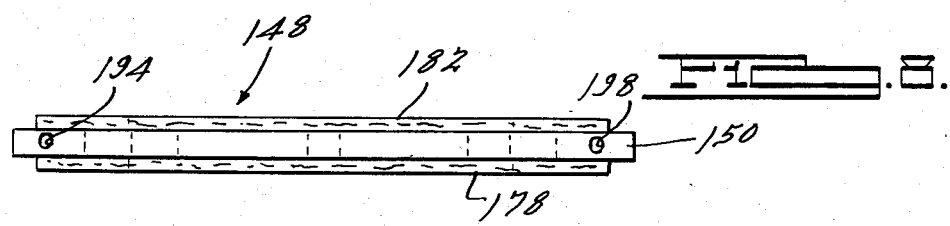
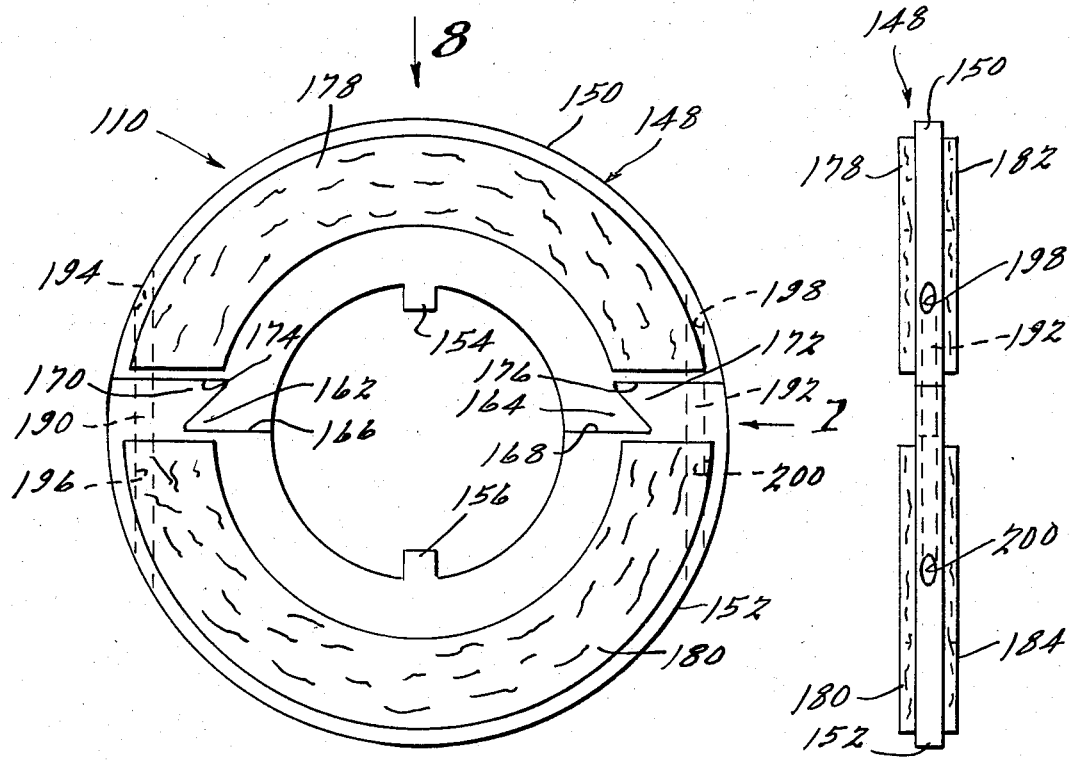

4,512,450

CLUTCH BRAKE

BRIEF SUMMARY OF THE INVENTION

This application is a continuation-in-part of the applicant's co-pending application Ser. No. 06/317,484, filed Nov. 2, 1981 for Clutch Brake, now abandoned.

This invention relates to clutch brakes and, more particularly, to an improved clutch brake particularly adapted for use with heavy duty, automotive vehicle clutches of the type conventionally utilized on heavy duty automotive vehicles, such as dump trucks, tractor-trailer combinations and the like.

Heretofore, clutch brakes have been utilized in connection with heavy duty automotive vehicle clutches for the purpose of retarding and stopping rotation of the driven shaft of the clutch upon disengagement of the main clutch of the automotive vehicle so that a gear shifting operation may be effected, the clutch brake being actuated by the throw-out mechanism when the main clutch of the vehicle is disengaged by the driver of the vehicle prior to a gear shifting operation. Numerous clutch brakes of the indicated character are disclosed in the prior art, such as, for example, in U.S. Pat. Nos. 1,684,471; 2,511,133 and 3,763,977. However, it is well known in the art that clutch brakes of the indicated character tend to wear out and become unserviceable before the useful life of the associated main clutch and transmission terminates with the result that the clutch brakes often require replacement several times during the useful life of the associated main clutch and transmission. For example, clutch brakes utilized on dump trucks often require replacement once or more per year. The installation of new or rebuilt prior art clutch brakes, such as the clutch brakes disclosed in the aforementioned U.S. Patents, necessitates partial disassembly of the driven shaft of the main clutch with the result that such replacement operation is difficult, time consuming and expensive.

An object of the present invention is to overcome disadvantages in prior clutch brakes of the indicated character and to provide an improved clutch brake that may be easily and quickly installed without requiring disassembly of the driven shaft of the associated main clutch.

Another object of the present invention is to provide an improved clutch brake that may be installed with a minimum of time, labor and expense.

Another object of the present invention is to provide an improved clutch brake that is relatively simple in construction, economical and commercially feasible to manufacture and assemble, durable, efficient and reliable in operation.

The above as well as other objects and advantages of the present invention will become apparent from the following description, the appended claims and the accompanying drawings.

BRIEF DESCRIPTION OF THE DRAWINGS

FIG. 5 is an elevational view of the components of another embodiment of the invention, showing the same prior to the assembly and installation thereof;

FIG. 6 is an enlarged elevational view of the components of the clutch brake illustrated in FIG. 5, showing the same after the assembly and installation thereof;

FIG. 7 is a side elevational view of the structure illustrated in FIG. 6, taken in the direction of the arrow 7; and FIG. 8 is a top view of the structure illustrated in FIG. 6, taken in the direction of the arrow 8.

DETAILED DESCRIPTION

Figure 1:
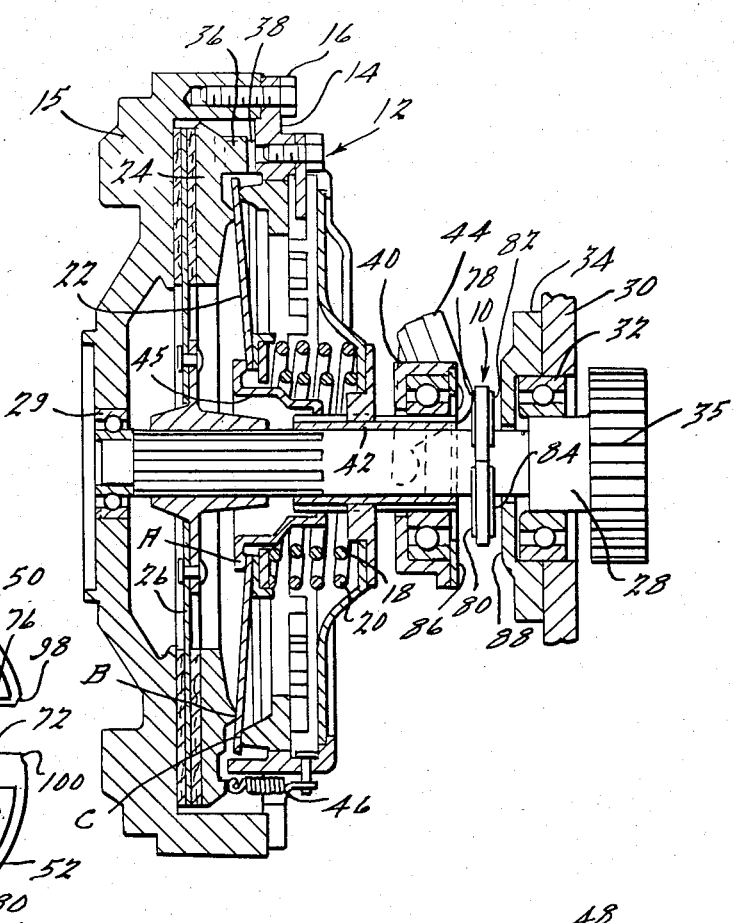
FIG. 1 is a side elevational view of a clutch brake embodying the present invention, showing the same installed on the driven shaft of an automotive vehicle main clutch.

Referring to the drawings, one embodiment of the invention is illustrated in FIGS. 1 through 4 thereof and is comprised of a clutch brake, generally designated 10, which, in FIG. 1 of the drawings, is illustrated as installed on a normally engaged, heavy duty type main clutch, generally designated 12, which is particularly adapted for use with a heavy duty transmission of the type conventionally utilized on heavy duty vehicles such as dump trucks, tractor-trailer combinations and the like. The main clutch 12 includes a cover member 14 which is mounted on an engine flywheel 15 through the agency of a plurality of bolts such as 16. A pair of centrally located pressure springs 18 and 20 are provided which exert a force on a plurality of radially extending clutch release levers 22 whereby spring pressure is increased by the lever ratio between inner, intermediate and outer fulcrum points shown generally at "A", "B" and "C", respectively. The multiplied force is transmitted to a pressure plate 24 and in turn to a driven disc 26 splined to the outer end of a rotatable transmission main gear driven shaft 28. The driven shaft 28 is supported at its forward end in the flywheel 15 by a bearing 29 and at its rearward end in the front wall of a stationary transmission housing 30 by a bearing 32, the bearing 32 being covered by a stationary bearing cap 34. The driven shaft 28 extends partially into the transmission housing 30 and carries an integral drive gear 35 for transmitting drive to the gears (not shown) of a conventional heavy duty transmission. The pressure plate 24 is driven by drive lugs 36 extending from the pressure plate into drive slots 38 provided in the cover member 14.

A clutch release bearing, illustrated generally at 40, is slidably disposed about the driven shaft 28 through the agency of a cylindrical sleeve 42 which is splined to the cover member 14 so as to be continuously rotated therewith and in turn, continuously rotate the release bearing with the cover member. The clutch release bearing is operated by a conventional yoke 44 through the clutch pedal linkage (not shown) and serves to release the clutch 12 by pulling the release bearing 40 away from the flywheel 15. This force is transmitted through the clutch release bearing 40 to the sleeve 42 and therefrom to a retainer sleeve 45 which in turn compresses the pressure springs 18 and 20 and relieves the spring load on the pressure plate 24 while simultaneously pulling the inner ends of the levers 22 away from the flywheel 15 so that the intermediate fulcrum point B on the back face of the pressure plate 24, moves to the right, as viewed in FIG. 1, again in a direction away from the flywheel. A plurality of retraction springs such as 46 then function to pull the pressure plate 24 away from the flywheel 15 to release the connection between the driven disc 26 and the flywheel. The main clutch construction and the operating mechanisms therefor heretofore described do not form a part of the present invention but are included to illustrate the utility and environment of the clutch brake 10 embodying the present invention.

The clutch brake 10 is provided for the purpose of retarding and stopping rotation of the main clutch driven shaft 28 upon disengagement of the main clutch so that gear shifting operations may be effected without clashing or putting undue strain on the transmission gears, particularly those incorporated in heavy duty transmissions.

Figures 2, 3:
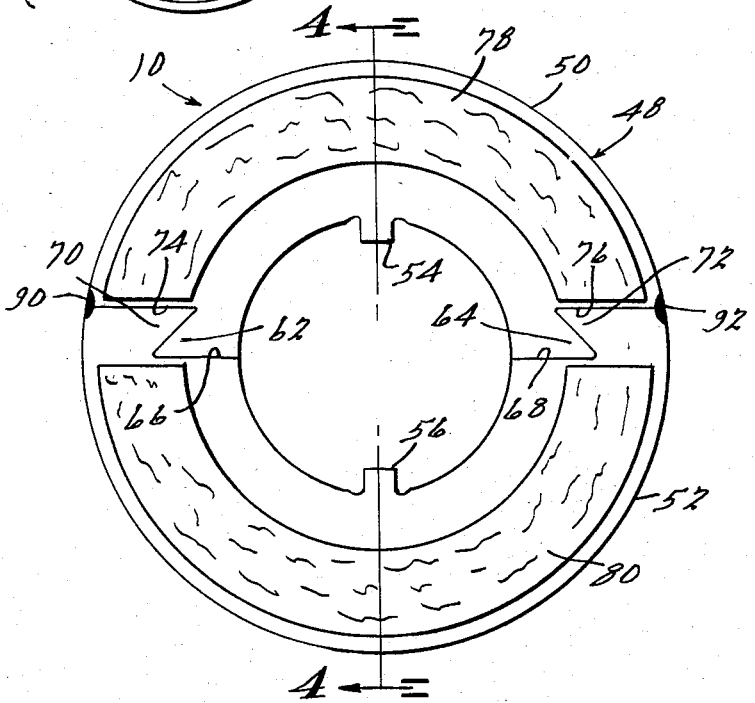
FIG. 2 is an elevational view of the components of the clutch brake illustrated in FIG. 1, showing the same prior to the assembly and installation thereof.
FIG. 3 is an enlarged elevational view of the clutch brake illustrated in FIG. 1.
Figure 4:
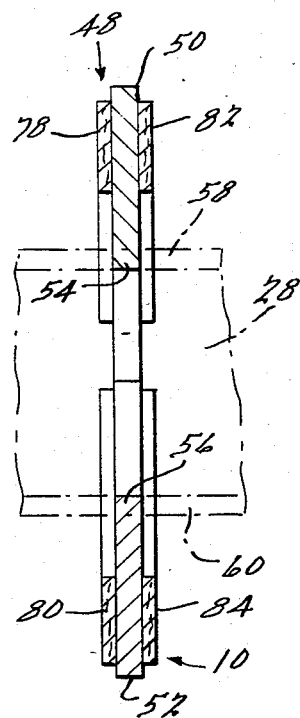
FIG. 4 is a sectional elevational view of the clutch brake illustrated in FIG. 3, taken on the line 4—4 thereof.

The clutch brake 10 is adapted to be located between the clutch release bearing 40 and the transmission bearing cap 34 and, in the fully assembled condition, as shown in FIGS. 1, 3 and 4 of the drawings, is comprised of an annular, substantially flat, generally ring shaped base 48 which includes initially separate sections 50 and 52, the section 50 having a radially inwardly projecting tang 54 on the inner periphery thereof and the section 52 having a radially inwardly projecting tang 56 on the inner periphery thereof, the tangs 54 and 56 being disposed in diametrically aligned relationship when the base 48 is in the finally assembled condition. The tangs 54 and 56 are adapted to slidably and drivingly engage opposed splines or key ways 58 and 60, respectively, formed on the outer periphery of the driven shaft 28. Thus, when the base 48 is finally assembled, the base is drivingly connected to the rotatable driven shaft 28 for rotation therewith while being axially movable thereon.

As shown in FIGS. 2 and 3, the free end portions of the section 50 of the base 48 define a pair of integral generally triangularly shaped or radially disposed teeth or tabs 62 and 64 which project in a generally radially outward direction and which are adapted to be received in complementary shaped recesses 66 and 68, respectively, defined by the free end portions of the section 52 of the base, while the free end portions of the section 52 define a pair of integral generally triangularly shaped or radially disposed teeth or tabs 70 and 72 which project in a generally radially inward direction and which are adapted to be received in complementary shaped recesses 74 and 76, respectively, defined by the free end portions of the section 50. The base 48, which is comprised of the sections 50 and 52, is preferably formed of steel or other suitable material having sufficient strength to withstand the forces exerted thereon, and, if desired, may be heat treated to any desired hardness.

Conventional friction facings 78, 80, 82 and 84, which may be formed of conventional clutch or brake lining material, are securely bonded to the opposite sides of each of the sections 50 and 52 of the base 48. In the final assembled condition of the base 48, the friction facings 78, 80, 82 and 84 are adapted to be located between a friction face 86 provided on the rear of the throw-out bearing 40 and another friction face 88 provided on the front of the stationary bearing cap 34, the friction faces 78 and 80 being associated with and cooperating with the friction face 86 on the release bearing 40 while the friction faces 82 and 84 are associated with and cooperate with the friction face 88 provided on the bearing cap 34.

While the clutch brake 10 may be utilized as original equipment, the clutch brake 10 is particularly adapted for use as a replacement for a previously used, worn out or otherwise unserviceable clutch brake which was originally installed as a part of the original equipment of the main clutch, and in order to install the clutch brake 10 on the driven shaft 28 without disassembly of the driven shaft 28, it is first necessary to remove the worn out or otherwise unserviceable clutch brake that was previously utilized. Such removal may be effected by utilizing a cutting torch or other suitable means for severing the unserviceable clutch brake, care being taken to protect the other components of the main clutch assembly from the heat of the cutting torch. After the removal of the unserviceable clutch brake, the sections 50 and 52 of the base 48 are placed in longitudinally spaced, parallel relationship on the shaft 28 between the friction face 86 on the throw-out bearing 40 and the friction face 88 on the bearing cap 34, the tang 54 of the section 50 being disposed in the key way 58 provided on the shaft 28 while the tang 56 of the section 52 is disposed in the key way 60 provided on the shaft 28. The sections 50 and 52 are then moved longitudinally on the shaft 28 toward each other and into substantially coplanar relationship so that the tooth portions 62 and 64 provided on the section 50 are disposed in the complementary shaped recesses 66 and 68 defined by the section 52 while the tooth portions 70 and 72 provided in the section 52 are disposed in the complementary shaped recesses 74 and 76 defined by the section 50 whereby the sections 50 and 52 are mechanically connected against movement in any radial direction relative to each other. In order to form a unitary structure and secure the sections 50 and 52 against relative movement with respect to each other longitudinally of the shaft 28, the adjoining peripheral portions of the sections 50 and 52 are spot welded, preferably by arc welding, as at 90 and 92, suitable recesses such as 94, 96, 98 and 100 being initially provided on the sections 50 and 52 to accommodate the weld seam. It is also preferred to ground the sections 50 and 52 during the arc welding process, and care must be taken to protect the other components from the heat generated by the welding process.

With the foregoing procedure, the clutch brake 10 embodying the present invention can thus be assembled and installed on the driven shaft 28 without necessitating partial disassembly of the driven shaft from the main clutch assembly and the associated transmission.

It will be understood that other cooperating tooth and complementary shaped recess configurations may be utilized to mechanically lock the sections 50 and 52 against any radial movement relative to each other, and that means other than welding may be utilized to secure the sections 50 and 52 against relative movement with respect to each other longitudinally of the shaft.

In the operation of the clutch brake 10, when the vehicle clutch pedal is initially depressed, the yoke 44 is rotated in a counterclockwise direction, as viewed in FIG. 1, through the agency of the clutch pedal linkage (not shown). As the yoke 44 rotates, it initially engages and applies a load to the release bearing 40 which, through the various operating components of the main clutch 12 described hereinabove, will cause the driving connection between the flywheel 15 and the driven disc 26 to be disengaged. In order to assist the operator of the vehicle in gear shifting operations, the inertia of the driven shaft 28 is braked or retarded. This is effected by further counterclockwise rotation of the yoke 44 which causes the load applied to the release bearing 40 to move the release bearing axially to the right, as viewed in FIG. 1, so that the friction surface 86 on the release bearing engages the friction surfaces 78 and 80 of the clutch brake 10 and moves the clutch brake 10 towards the bearing cap 34 so that the friction surfaces 82 and 84 engage the friction surface 88 on the bearing cap. Since the tangs 54 and 56 of the base 48 are keyed to the driven shaft 28, and since the friction surfaces 78, 80, 82 and 84 are loaded or compressed between the friction face 86 on the release bearing 40 and the friction face 88 on the bearing cap 34, and since the bearing cap 34 is stationary, the clutch brake 10 will slow down or stop rotation of the driven shaft 28 and the clutch driven disc 26 thus enabling the vehicle operator to easily and quickly shift the gears of the vehicle transmission.

From the foregoing, it will be appreciated that the release bearing 40, in addition to controlling the operation of the main clutch, also functions as the actuating means for the clutch brake 10 since the release bearing selectively engages the clutch brake 10 and applies a load thereto so as to move the clutch brake 10 into frictional engagement with the stationary bearing cap 34. It will also be appreciated that when the clutch brake 10 is in the unloaded condition, the clutch brake 10 is floatingly supported on the driven shaft 28 since the only positive connection between the clutch brake 10 and the driven shaft 28 is through the tangs 54 and 56 which engage the key ways 58 and 60 on the driven shaft.

Another embodiment of the invention is illustrated in FIGS. 5 through 8 of the drawings and is comprised of a clutch brake, generally designated 110, which may be installed on the driven shaft 28 of the main clutch 12 in the same location that the clutch brake 10 is installed on such driven shaft, the clutch brake 110 being provided for the purpose of retarding and stopping rotation of the main clutch driven shaft 28 upon disengagement of the main clutch so that gear shifting operations may be effected without clashing or putting undue strain on the transmission gears, particularly those incorporated in heavy duty transmission.

As previously mentioned, the clutch brake 110 is adapted to be located between the clutch release bearing 40 and the transmission bearing cap 34 and, in the fully assembled condition, as shown in FIGS. 6, 7 and 8 of the drawings, is comprised of an annular, substantially flat, generally ring shaped base 148 which includes initially separate sections 150 and 152, the section 150 having a radially inwardly projecting tang 154 on the inner periphery thereof and the section 152 having a radially inwardly projecting tang 156 on the inner periphery thereof, the tangs 154 and 156 being disposed in diametrically aligned relationship when the base 148 is in the finally assembled condition. The tangs 154 and 156 are adapted to slidably and drivingly engage the opposed splines or key ways 58 and 60, respectively, formed on the outer periphery of the driven shaft 28. Thus, when the base 148 is finally assembled, the base 148 is also drivingly connected to the rotatable driven shaft 28 for rotation therewith while being axially movable thereon.

As shown in FIGS. 5 and 6, the free end portions of the section 150 of the base 148 define a pair of integral generally triangularly shaped or radially disposed teeth or tabs 162 and 164 which project in a generally radially outward direction and which are adapted to be received in complementary shaped recesses 166 and 168, respectively, defined by the free end portions of the section 152 of the base, while the free end portions of the section 152 define a pair of integral generally triangularly shaped or radially disposed teeth or tabs 170 and 172 which project in a generally radially inward direction and which are adapted to be received in complementary shaped recesses 174 and 176, respectively, defined by the free end portions of the section 150. The base 148, which is comprised of the sections 150 and 152, is also preferably formed of steel or other suitable material having sufficient strength to withstand the forces exerted thereon, and, if desired, may be heat treated to any desired hardness.

Conventional friction facings 178, 180, 182 and 184, which may also be formed of conventional clutch or brake lining material, are securely bonded to the opposite sides of each of the sections 150 and 152 of the base 148. In the final assembled condition of the base 148, the friction facings 178, 180, 182 and 184 are adapted to be located between the friction face 86 provided on the rear of the throw-out bearing 40 and the friction face 88 provided on the front of the stationary bearing cap 34, the friction faces 178 and 180 being associated with and cooperating with the friction face 86 on the release bearing 40 while the friction faces 182 and 184 are associated with and cooperate with the friction face 88 provided on the bearing cap 34.

While the clutch brake 110 may also be utilized as original equipment, the clutch brake 110 is also particularly adapted for use as a replacement for a previously used, worn out or otherwise unserviceable clutch brake which was originally installed as a part of the original equipment of the main clutch, and in order to install the clutch brake 110 on the driven shaft 28 without disassembly of the driven shaft 28, it is first necessary to remove the worn out or otherwise unserviceable clutch brake in the manner previously described, care being taken not to damage the other components of the main clutch assembly during the removal of the unserviceable clutch brake. The sections 150 and 152 of the base 148 are then placed in longitudinally spaced, parallel relationship on the shaft 28 between the friction face 86 on the throw-out bearing 40 and the friction face 88 on the bearing cap 34, the tang 154 of the section 150 being disposed in the key way 58 provided on the shaft 28 while the tang 156 of the section 162 is disposed in the key way 60 provided on the shaft 28. The sections 150 and 152 are then moved longitudinally on the shaft 28 toward each other and into substantially coplanar relationship so that the tooth portions 162 and 164 provided on the section 150 are disposed in the complementary shaped recesses 166 and 168 defined by the section 152 while the tooth portions 170 and 172 provided on the section 152 are disposed in the complementary shaped recesses 174 and 176 defined by the section 150 whereby the sections 150 and 152 are mechanically connected against movement in any radial direction relative to each other. In order to form a unitary structure and secure the sections 150 and 152 against relative movement with respect to each other longitudinally of the shaft 28, the adjoining peripheral portions of the sections 150 and 152 are connected by pins 190 and 192 which are driven into aligned passageways 194 and 196 and aligned passageways 198 and 200 provided in the sections 150 and 152, the pins 190 and 192 preferably being formed of steel or other suitable material having sufficient strength to withstand the forces exerted thereon. With the foregoing procedure, the clutch brake 110 can be assembled and installed on the driven shaft 28 without necessitating partial disassembly of the driven shaft from the main clutch assembly and the associated transmission.

It will be understood that other cooperating tooth and complementary shaped recess configurations may be utilized to mechanically lock the sections 150 and 152 against any radial movement relative to each other, ahd that means other than pin means may be utilized to secure the sections 150 and 152 against relative movement with respect to each other longitudinally of the shaft.

In the operation of the clutch brake 110, when the vehicle clutch pedal is initially depressed, the yoke 44 is rotated in a counterclockwise direction, in the manner previously described, through the agency of the clutch pedal linkage (not shown). As the yoke 44 rotates, it initially engages and applies a load to the release bearing 40 which, through the various operating components of the main clutch 12 described hereinabove, will cause the driving connection between the flywheel 15 and the driven disc 26 to be disengaged. In order to assist the operator of the vehicle in gear shifting operations, the inertia of the driven shaft 28 is braked or retarded. This is effected by further counterclockwise rotation of the yoke 44 which causes the load applied to the release bearing 40 to move the release bearing so that the friction surface 86 on the release bearing engages the friction surfaces 178 and 180 of the clutch brake 110 and moves the clutch brake 110 towards the bearing cap 34 so that the friction surfaces 182 and 184 engage the friction surface 88 on the bearing cap. Since the tangs 154 and 156 of the base 148 are keyed to the drive shaft 28, and since the friction surfaces 178, 180, 182 and 184 are loaded or compressed between the friction face 86 on the release bearing 40 and the friction face 88 on the bearing cap 34, and since the bearing cap 34 is stationary, the clutch brake 110 will slow down or stop rotation of the driven shaft 28 and the clutch driven disc 26 thus enabling the vehicle operator to easily and quickly shift gears of the vehicle transmission.

From the foregoing, it will be appreciated that the release bearing 40, in addition to controlling the operation of the main clutch, also functions as the actuating means for the clutch brake 110 since the release bearing selectively engages the clutch brake 110 and applies a load thereto so as to move the clutch brake 110 into frictional engagement with the stationary bearing cap 34. It will also be appreciated that when the clutch brake 110 is in the unloaded condition, the clutch brake 110 is floatingly supported on the driven shaft 28 since the only positive connection between the clutch brake 110 and the driven shaft 28 is through the tangs 154 and 156 which engage the key ways 58 and 60 on the driven shaft.

While preferred embodiments of the invention have been illustrated and described, it will be understood that various changes and modifications may be made without departing from the spirit of the invention.

What is claimed is:

1. A clutch brake comprising, in combination, an annular base including first and second sections, said first and second sections each being substantially flat and having spaced substantially parallel opposite side surfaces, said first and second sections each being generally semiring shaped whereby said first and second sections each include opposite end portions, the opposite end portions of said first section defining a pair of radially disposed teeth within the confines of the inner and outer edges of the semiring shape of said first section and selectively received in a pair of complementary shaped recesses defined by the opposite end portions of said second section, the opposite end portions of said second section defining a pair of radially disposed teeth within the confines of the inner and outer edges of the semiring shape of said second section and selectively received in a pair of complementary shaped recesses defined by the opposite end portions of said first section, said teeth and recesses being selectively engaged and interlocking said first and second sections against movement with respect to each other in any radial direction, a plurality of friction facings secured to the opposite side surfaces of said first and second sections, said first and second sections also each including an integral radially inwardly projecting tang portion, and means disposed entirely between said opposite side surfaces of said first and second sections and selectively connecting the adjoining end portions of said first and second sections to each other to form a unitary structure.

2. A clutch brake comprising, in combination, an annular base including first and second sections, said first and second sections each being substantially flat and having spaced substantially parallel opposite side surfaces, said first and second sections each being generally semiring shaped whereby said first and second sections each include two free end portions, the free end portions of said first section defining a pair of radially disposed teeth within the confines of the inner and outer edges of the semiring shape of said first section and projecting in a generally radial direction and selectively disposed in a pair of complementary shaped recesses defined by the free end portions of said second section, the free end portions of said second section defining a pair of radially disposed teeth within the confines of the inner and outer edges of the semiring shape of said second section and projecting in a generally radial direction and selectively disposed in a pair of complementary shaped recesses defined by the free end portions of said first section, said teeth and recesses being selectively engaged and interlocking said first and second sections against movement with respect to each other in any radial direction, a plurality of friction facings secured to the opposite side surfaces of said first and second sections, said first and second sections each having a radially inwardly projecting tang on the inner periphery thereof, said tangs being disposed in diametrically aligned relationship, and means disposed entirely between said parallel side surfaces of said first and second sections and selectively securing the adjoining free end portions of said first and second sections to each other to form a unitary structure.

3. A clutch brake for use with an automotive vehicle clutch having a rotatable shaft, said clutch brake comprising, in combination, an annular base circumposed on said shaft and including first and second sections, said first and second sections each being substantially flat and having spaced substantially parallel planar side surfaces generally semiring shaped whereby said first and second sections each include two free end portions, the free end portions of said first section defining a pair of radially disposed teeth within the confines of the inner and outer edges of the semiring shape of said first section and selectively received in a pair of complementary shaped recesses defined by the free end portions of said second section, the free end portions of said second section defining a pair of radially disposed teeth within the confines of the inner and outer edges of the semiring shape of said second section and selectively received in a pair of complementary shaped recesses defined by the free end portions of said first section, said teeth and recesses being selectively engaged and interlocking said first and second sections against movement with respect to each other in any radial direction, a plurality of friction facings secured to the opposite side surfaces of said base, said first and second sections also each including means drivingly connecting said base to said shaft for rotation therewith while permitting axial movement relative thereto, and pin means disposed entirely between said planar side surfaces of said first and second sections and selectively securing the adjoining free end portions of said first and second sections to each other and preventing relative movement of said first and second sections with respect to each other axially of said shaft.

4. A clutch brake comprising, in combination, an annular base formed of metal and including first and second sections, said first and second sections each being substantially flat and having substantially parallel planar side surfaces generally semiring shaped whereby said first and second sections include spaced free end portions, the free end portions of said first section defining a pair of radially disposed generally triangularly shaped teeth within the confines of the inner and outer edges of the semiring shape of said first section and projecting in a generally radial direction and selectively disposed in a pair of complementary shaped recesses defined by the free end portions of said second section, the free end portions of said second section defining a pair of radially disposed generally triangularly shaped teeth within the confines of the inner and outer edges of the semiring shape of said second section and projecting in a generally radial direction and selectively disposed in a pair of complementary shaped recesses defined by the free end portions of said first section, said teeth and said recesses being selectively engaged and interlocking said first and second sections against movement with respect to each other in any radial direction, a plurality of friction facings bonded to the opposite side surfaces of said first and second sections, said first and second sections each having a radially inwardly projecting tang on the inner periphery thereof, said tangs being disposed in diametrically aligned relationship, and pin means disposed entirely between said side surfaces of said first and second sections and selectively mechanically connecting the adjoining free end portions of said first and second sections to each other to form a unitary structure.

5. In combination with an automotive vehicle clutch having a rotatable shaft, a clutch brake comprising an annular base circumposed on said shaft and including first and second sections, said first and second sections each being substantially flat and having spaced substantially parallel planar side surfaces generally semiring shaped whereby said first and second sections each include a pair of free end portions, the free end portions of said first section defining a pair of radially disposed teeth within the confines of the inner and outer edges of the semiring shape of said first section and selectively disposed in a pair of complementary shaped recesses defined by the free end portions of said second section, the free end portions of said second section defining a pair of radially disposed teeth within the confines of the inner and outer edges of the semiring shape of said second section and selectively disposed in a pair of complementary shaped recesses defined by the free end portions of said first section, said teeth and said recesses being selectively engaged and interlocking said first and second sections against movement with respect to each other in any radial direction, the free end portions of said first section defining a pair of parallel passageways open at each end and aligned with a pair of parallel passageways open at at least one end and defined by the free end portions of said second section, and a pair of cylindrical pins, one of said pins being selectively disposed in one of the passageways defined by said first section and in the passageway defined by said second section aligned therewith, the other of said pins being selectively disposed in the other of the passageways defined by said first section and in the passageway defined by said second section aligned therewith to secure said first and second sections against relative movement with respect to each other longitudinally of said shaft, a plurality of friction facings secured to the opposite side surfaces of said base, said first and second sections also each including means drivingly connecting said base to said shaft for rotation therewith while permitting axial movement relative thereto.

* * * * *